A. AKERBERG.
LONG LINE HAULER.
APPLICATION FILED MAY 1, 1916.
1,279,213.
Patented Sept. 17, 1918.
2 SHEETS—SHEET 2.
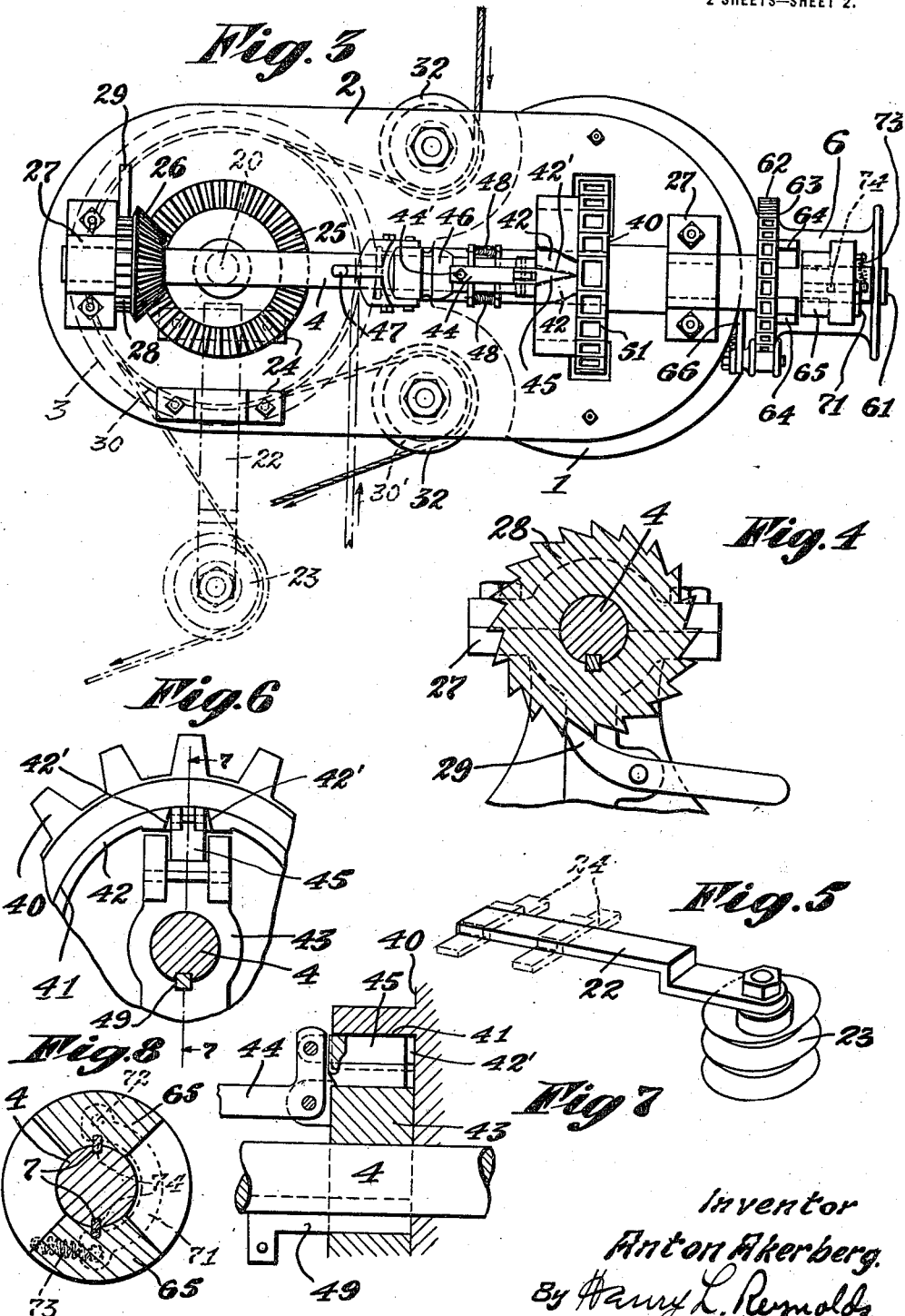

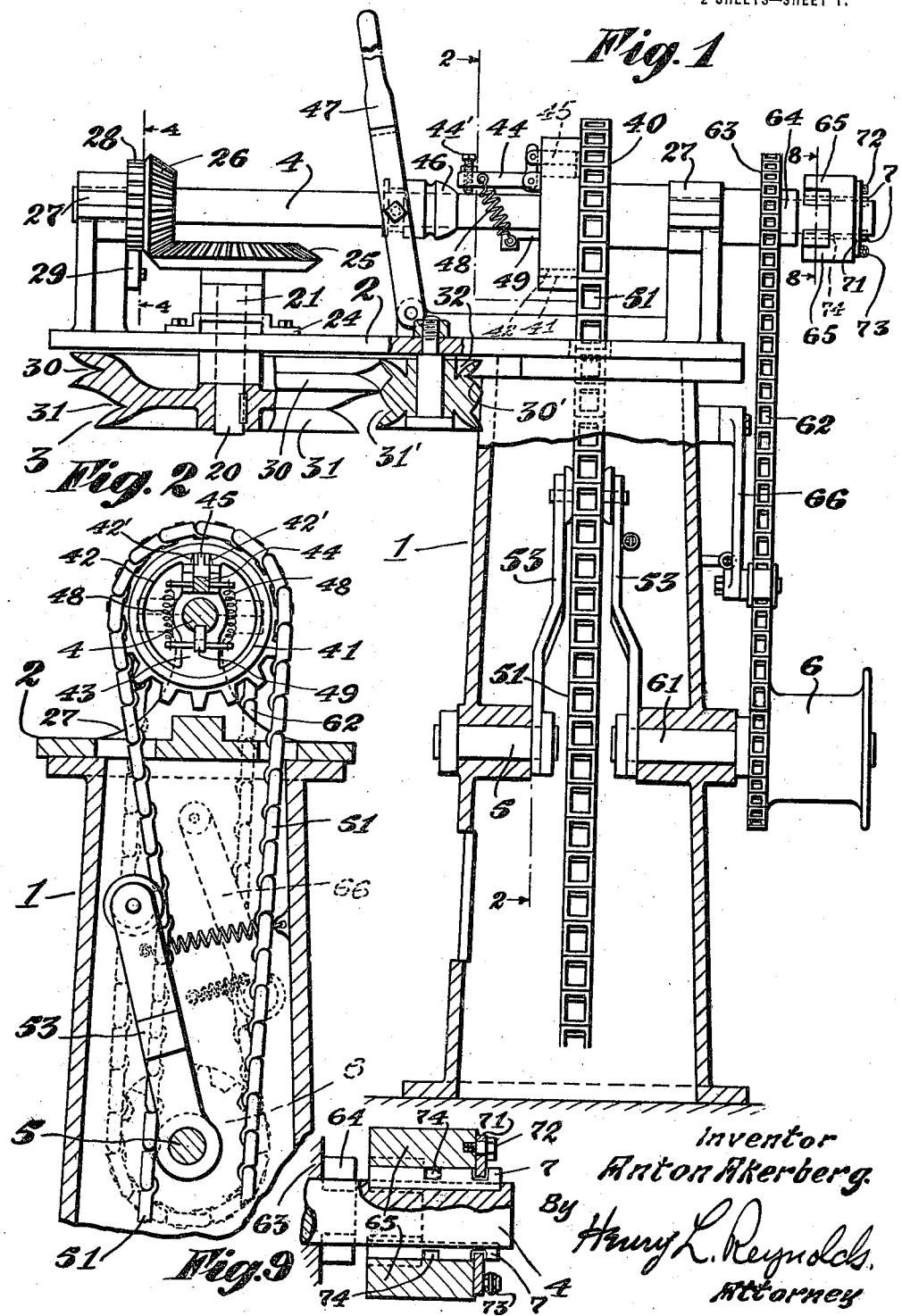

UNITED STATES PATENT OFFICE.

ANTON AKERBERG, OF PRINCE RUPERT, BRITISH COLUMBIA, CANADA.

LONG-LINE HAULER.

1,279,213.    Specification of Letters Patent.    Patented Sept. 17, 1918.

Application filed May 1, 1916. Serial No. 94,852.

*To all whom it may concern:*

Be it known that I, ANTON AKERBERG, citizen of the Dominion of Canada, and resident of Prince Rupert, British Columbia, Canada, have invented certain new and useful Improvements in Long-Line Haulers, of which the following is a specification.

My invention relates to power gurdeys, or devices used in deep-sea fishing to haul in long lines by power, and especially such lines as are used in halibut fishing.

The object of my invention is to provide a new device of the class described, which will be simple and efficient, and which can be more easily operated than other devices of a similar character.

In the accompanying drawings I have shown my invention in the form which is now preferred by me.

Figure 1 is a side elevation of my device, parts being shown in section.

Fig. 2 is a section on the line 2—2 of Fig. 1.

Fig. 3 is a plan view of my device, a part being shown broken away.

Fig. 4 is a section on line 4—4 of Fig. 1.

Fig. 5 is a perspective view of an attachment which is used in connection with my device.

Fig. 6 is a fragmentary side view of one of the clutch members.

Fig. 7 is a section of the same taken on line 7—7 of Fig. 6.

Fig. 8 is a section on line 8—8 of Fig. 1, showing the second clutch member.

Fig. 9 is a fragmentary section of the jaw clutch, showing the means for locking it in position.

My device is mounted upon a post 1, which is preferably hollow, as shown in Fig. 1. Upon the upper end of this post 1, and extending horizontally therefrom, is a plate or arm 2. A vertical shaft 20 is journaled in arm 2, as at 21, and carries a line-gripping or line-hauling wheel 3. This line-hauling wheel 3 has grooves 30 and 31 in which to receive the line, said grooves being of different diameters. Line-hauling wheel 3 is mounted upon the under side of the plate 2, in order that the small lines which are attached to the main line may not catch in any part of the mechanism, or have to pass over any part thereof.

At each side of the plate 2, adjacent the wheel 3, are journaled line-guiding wheels 32. These wheels 32 have two grooves 30' and 31' in line with grooves 30 and 31, respectively, of the wheel 3. When the line is being hauled in, it is passed about the guiding wheels 32 and the gripping wheel 3 as shown by full and dotted lines in Fig. 3, if the line is to be hauled in upon the opposite side of the gurdey to the direction from which it comes. If, however, it is to be hauled in upon the same side of the gurdey as the direction from which it comes, it must be arranged differently.

In the latter case, an arm or bar 22, shown in perspective in Fig. 5, and carrying a guiding wheel 23 upon the lower side at its outer end, is inserted in guides or braces 24 provided upon plate 2. The line is then passed about the wheel 3 and wheel 23, as shown in Fig. 3 in dot and dash lines.

Upon the upper end of shaft 20 is mounted a bevel gear 25, meshing with a bevel gear 26 upon a horizontal shaft 4. Shaft 4 is mounted in bearings 27 upon arm 2, and is connected to drive wheel 3 by any suitable clutch mechanism.

As herein shown, this clutch consists of a sprocket wheel 40, having an internal clutch surface 41, and an expansible ring 42 which is adapted to engage the surface 41. This ring 42 is split, as shown at 42', and its ends tapered. A bar 43 is secured to turn with the shaft 4, and upon this bar is pivoted a bell-crank lever 44. Upon one end or arm of this lever is pivoted a wedge 45. A cone 46 is secured upon shaft 4, and engages a set screw 44' in the other arm of the bell-crank lever. When the cone 46 is pushed over by the lever 47, this raises one arm of the bell-crank lever, and pushes the wedge 45 between the split ends of the ring 42. The ring is thereby expanded, and clutches surface 41 of the sprocket wheel. Chain 51 connects sprocket wheel 40 with any suitable driving means, preferably a sprocket wheel, not shown, mounted in the post 1. A spring 48, secured to a key 49, disengages the clutch when the cone 46 is withdrawn. A tightener 53 may be provided for the chain 51 if desired.

In operation, the clutch is thrown in and out intermittently, and in order to prevent the shaft 4 from turning backward, I provide a member having ratchet teeth 28, which is engaged by a ratchet arm 29, pivoted on the frame.

To assist in hauling the line when it is not desired to use the wheel 3, or for other similar work, I provide a gipsy head 6, pivoted upon the post 1, at 61. A chain 62 connects the gipsy head with a sprocket 63 upon the shaft 4, and free to turn thereon. This sprocket 63 carries one part of a jaw clutch; this part 64 being adapted to fit into a complementary part 65. Member 65 is mounted to turn with the shaft 4, but is free to slide longitudinally thereof within certain limits.

As shown in Fig. 8, the member 65 is secured to the shaft by two diametrically opposed keys 7, upon which it slides. A semicircular catch 71 is pivoted on the member 65 at 72, and is held in place by a spring 73. A pair of slots 74 are cut in the keys 7, so that catch 71 may fit in these slots and be held thereby in adjusted position. When the clutch is disengaged, the catch 71 engages the outer of the pair of slots in both keys 7. To engage the clutch, the catch 71 is first disengaged, and member 65 pushed into engagement with member 64. The catch 71 then engages the inner of the pair of slots 74, and holds the clutch members in engagement, and turns the gipsy head. A tightener 66 may be provided, if desired.

What I claim as my invention is as follows:

1. A line hauling device of the class described, comprising a horizontally projecting frame member, a line hauling wheel mounted on the under side of said frame member to turn in a horizontal plane, means for turning said wheel, two line guiding pulleys similarly mounted on the frame member and at one side of the line hauling wheel to receive the line before and after passing about said wheel, a bar, a third line-guiding pulley mounted upon said bar, and means for detachably securing said bar upon the frame member in position to receive a line which enters and leaves at the same side of the frame member.

2. A line hauling apparatus of the class described, comprising a frame having a post and a frame member projecting laterally from the upper end of the post, a horizontal shaft journaled upon and above said number, means for turning said shaft, a line gripping wheel and line guiding wheels journaled on the underside of the projecting member, a bar slidable upon and detachable from said frame member, a shoulder formed upon the bar for limiting its movement toward the frame member, a third line guiding pulley mounted upon said bar and adapted to turn in a horizontal plane, and driving means connecting the line gripping wheel with the horizontal shaft.

3. A line hauling device of the class described comprising a horizontally projecting frame member, a line hauling wheel mounted on the underside of said frame member to turn in a horizontal plane, means for turning said wheel, two line guiding pulleys mounted on the frame member and at one side of the line hauling wheel to receive the line before and after its passage about said wheel, a third line guiding pulley and means for mounting said pulley upon the frame member in such position that it lies to one side of the line hauling wheel and in position to receive a line which enters and leaves at the same side of the frame member.

Signed at Prince Rupert, B. C., this 25th day of March, 1916.

ANTON AKERBERG.

Copies of this patent may be obtained for five cents each, by addressing the "Commissioner of Patents, Washington, D. C."